United States Patent [19]
DeVisser et al.

[11] 3,778,633
[45] Dec. 11, 1973

[54] AUTOMATIC ELECTRIC POWER SOURCE TRANSFER APPARATUS

[75] Inventors: Christian DeVisser, Clinton; Donald Orville Myers, Normal, both of Ill.

[73] Assignee: General Electric Company, New York, N.Y.

[22] Filed: Aug. 14, 1972

[21] Appl. No.: 280,108

[52] U.S. Cl. .............................. 307/64, 200/50 C
[51] Int. Cl. ............................................. H02j 9/00
[58] Field of Search ...................... 200/50 A, 50 C; 307/64, 66, 141, 141.4, 149

[56] References Cited
UNITED STATES PATENTS

| | | | |
|---|---|---|---|
| 3,401,364 | 9/1968 | Whiting | 200/50 C |
| 3,198,898 | 8/1965 | Piteo, Jr. | 200/50 C |
| 3,473,041 | 10/1969 | Flynn et al. | 307/64 |

*Primary Examiner*—Herman J. Hohauser
*Attorney*—Stephen A. Young et al.

[57] ABSTRACT

A pair of over-center spring mechanism type molded case electric circuit breakers are disposed in end-to-end spaced alignment. The circuit breakers are each multi-pole circuit breakers and each includes a single operating handle of the reciprocating toggle type. The handle of each of the breakers must travel a greater portion of the possible full length of travel in going from OFF toward ON position in order to operate the contacts than the same handle has to when moving from ON toward OFF position in order to operate the contacts. As a result, when both handles are operated simultaneously by a slide member, the circuit breaker which was in ON condition at the beginning of travel is moved to OFF condition before the circuit breaker which was in OFF condition at the beginning of travel moves far enough to actuate its mechanism to ON condition. Accordingly, the initially closed circuit breaker is opened before the initially open circuit breaker is closed, thereby avoiding any possibility of an overlap condition in which both circuit breakers may be closed at the same time, which might short circuit the power sources. As a further precaution, a "walking beam" interlock member is included at the back of the supporting base. The walking beam carries projections at each end extending into the circuit breakers respectively and positively preventing the closing of both circuit breakers at the same time.

10 Claims, 5 Drawing Figures

AUTOMATIC ELECTRIC POWER SOURCE TRANSFER APPARATUS

The circuit breakers are supported on a generally planar supporting base by suitable means, such as by bolts extending through mounting holes, provided in the breaker casing. A pair of bracket members are mounted on the supporting base close to and on opposite sides of each of the circuit breakers respectively and are interconnected by a bridging member such as a bolt interconnecting each pair of brackets. The brackets extend above the top surface of the circuit breakers and serve to support an elongated generally rectangular box-like housing which contains a driving motor with a drive screw having a traveling nut of the ball-bearing type thereon which serves to drive a longitudinally extending channel-shaped slide or ganging member which overlies and releasably engages the handles of both of the circuit breakers. Energizing of the motor causes the traveling nut to travel along the spiral shaft, driving the longitudinal slide member in a longitudinally direction, operating the handles of both of the circuit breakers simultaneously.

The circuit breakers are each of the type having an over-center spring mechanism which is of such a design that the handle of each of the breakers must travel a greater portion of the possible full length of travel in going from OFF toward ON position in order to operate the contacts than the same handle has to when moving from ON toward OFF position in order to operate the contacts. As a result, when both handles are operated simultaneously by the slide member, the circuit breaker which was in ON condition at the beginning of travel is moved to OFF condition before the circuit breaker which was in OFF condition at the beginning of travel moves far enough to actuate its mechanism to ON condition. Accordingly, the initially closed circuit breaker is opened before the initially open circuit breaker is closed, thereby avoiding any possibility of an overlap condition in which both circuit breakers may be closed at the same time, which might short circuit the power sources. As a further precaution, a "walking beam" interlock member is included at the back of the supporting base. The walking beam carries projections at each end extending into the circuit breakers respectively and positively preventing the closing of both circuit breakers at the same time.

The box-like housing which supports and encloses the driving motor and the slide member is hinged at one side to the aforesaid supporting brackets, so that when the opposite side is released by releasing clamping screws, the entire housing, together with the motor and slide mamber, may be swung to a retracted position away from the circuit breakers, permitting full access to each of the circuit breakers for manual operation thereof if desired, as well as access to the busbar connections between the circuit breakers.

Since the operating mechanism box is supported on the support brackets which in turn are supported on the generally planar support independently of the circuit breakers, it is possible to remove the circuit breakers, in order to replace or repair them, without dismounting the motor operating assembly.

Suitable control circuitry is provided to accomplish the desired automatic operation to disconnect the power consuming apparatus from a first "normal" power source and then to connect it to an emergency or stand-by power source.

Since the housing which supports the motor and operating slide member is hinged along one of its longitudinal sides, the arc through which it has to move to retracted position is of relatively short radius and does not require excessive clearance space. In addition, since the breakers are ordinarily mounted vertically one above the other, the motor-operated mechanism housing remains in retracted or open position without the force of gravity tending to return it to its closed or engaging position.

FIELD OF THE INVENTION

The present invention relates to automatic electric power source transfer apparatus, and particularly to such apparatus utilizing two conventional compact high interrupting and current-withstand capacity switching devices of the molded case circuit breaker type.

BACKGROUND OF THE INVENTION

It is often necessary in applications such as hospitals, factories, public buildings, etc., to provide a stand-by source of electric power for use in cases where the normal power supply fails for some reason. In such cases, it is also desirable to provide equipment which switches the power-consuming apparatus of the installation from the external normal power source to the stand-by source automatically, i.e., without the necessity of manual operation.

Prior art apparatus for the purpose of performing functions of the type described has been generally available for a number of years. Such apparatus, however, has been relatively large and expensive in relation to the amount of power handled, creating a problem as to space requirements. This problem has been accentuated by the fact that power-consuming needs of installations requiring such equipment have been steadily increasing in recent years and are expected to continue to increase. A concomitant disadvantage of prior art apparatus of the type described having substantial power handling ability, is its relatively high expense. Apart from size, power-handling ability and expense, prior art apparatus of the type described, although including means for permitting manual operation in case of failure of the automatic operating means, has provided for such manual operation only by relatively large and difficult to operate means.

In addition to the aforesaid disadvantages, prior art apparatus of which the present inventors are aware has involved automatic operating mechanism which in one way or another is connected to or mounted on the switching means used. Thus if it should become necessary to replace or repair such switching means, it has been necessary to disturb or remove the mounting means of the automatic operating mechanism. This not only entails additional time and work, but introduces the possibility of incorrect reassembly and consequent difficulty resulting from incorrectly positioned or adjusted condition of the automatic operating mechanism.

OBJECTS OF THE INVENTION

It is an object of the invention to provide automatic electric power source transfer apparatus utilizing commercially available compact high interrupting capacity, and current-withstandability switching devices, and particularly molded case circuit breakers, with or without automatic opening means.

It is another object of the invention to provide automatic electric power source transfer equipment of the type described which is extremely compact.

It is a further object of the invention to provide an electric power source automatic transfer apparatus which is relatively simple in construction and relatively inexpensive.

It is another object of the invention to provide automatic electric power source transfer equipment which includes motor-driven operating means which can easily be moved to a retracted position, allowing full access to operating handles of the switching devices utilized for manual operation in cases of necessity, and wherein such retracting movement does not require substantial space and wherein the automatic operating mechanism can be moved to a retracted position without opposition from the force of gravity, facilitating access to the switching devices as well as to the busing interconnecting the switching devices.

It is a further object of the invention to provide automatic electric power transfer apparatus including electric motor driving means which is supported in such a way that the basic switching apparatus may be removed for repair or replacement without dismounting the motor driven mechanism or disturbing its general adjustment and alignment.

It is a further general object of the invention to provide automatic electric power transfer apparatus which is relatively simple in construction and dependable in operation.

SUMMARY OF THE INVENTION

In accordance with the invention, a pair of high capacity switching devices, such as molded case circuit breakers, (either automatic or non-automatic), are mounted in end-to-end spaced alignment on a supporting base by mounting bolts which pass through mounting holes in the circuit breakers. Automatic operating mechanism is also supported on the supporting base by means which is essentially independent of the breaker mounting means, thereby facilitating the removal of the switching devices such as for repair or replacement. The automatic operating mechanism is contained within an elongated generally box-like enclosure havig a single open wall overlying and facing the tops of the circuit breakers and extending across the devices. The automatic operating mechanism includes a ganging slide member which picks up the handles or both of the circuit breakers, and a reversible motor which drives the slide member in reciprocating longitudinal fashion to operate both handles of the switching devices (circuit breakers) simultaneously.

The switching devices or circuit breakers are selected to be of the type in which an over-center operating mechanism is utilized having the characteristic that the handle must be moved a substantially greater portion of its total possible movement when moving from OFF to ON position than is required when moving from its ON to its OFF position. By this means, although the handles are directly interconnected by a ganging member and operated simultaneously, it is always assured that the initially closed switching device will be opened before the initially open switching device is closed thereby avoiding the possibility of an overlap of closed conditions of the switching devices, which could cause a short circuit of both of the power sources.

The housing for the automatic operating mechanism is, furthermore, hinged along one of its longitudinal sides, and is releasably held by screws at the other side. Accordingly, it is possible to release the screws and to swing the motor-operating mechanism in the manner of a door to a retracted position in which it retains itself without opposition by the force of gravity, permitting full access to the circuit breaker operating handles and the interconnections between the circuit breakers.

The invention will be more fully understood from the following detailed description, and its scope will be pointed out in the appended claims.

DESCRIPTION OF A PREFERRED EMBODIMENT

Figure 1:
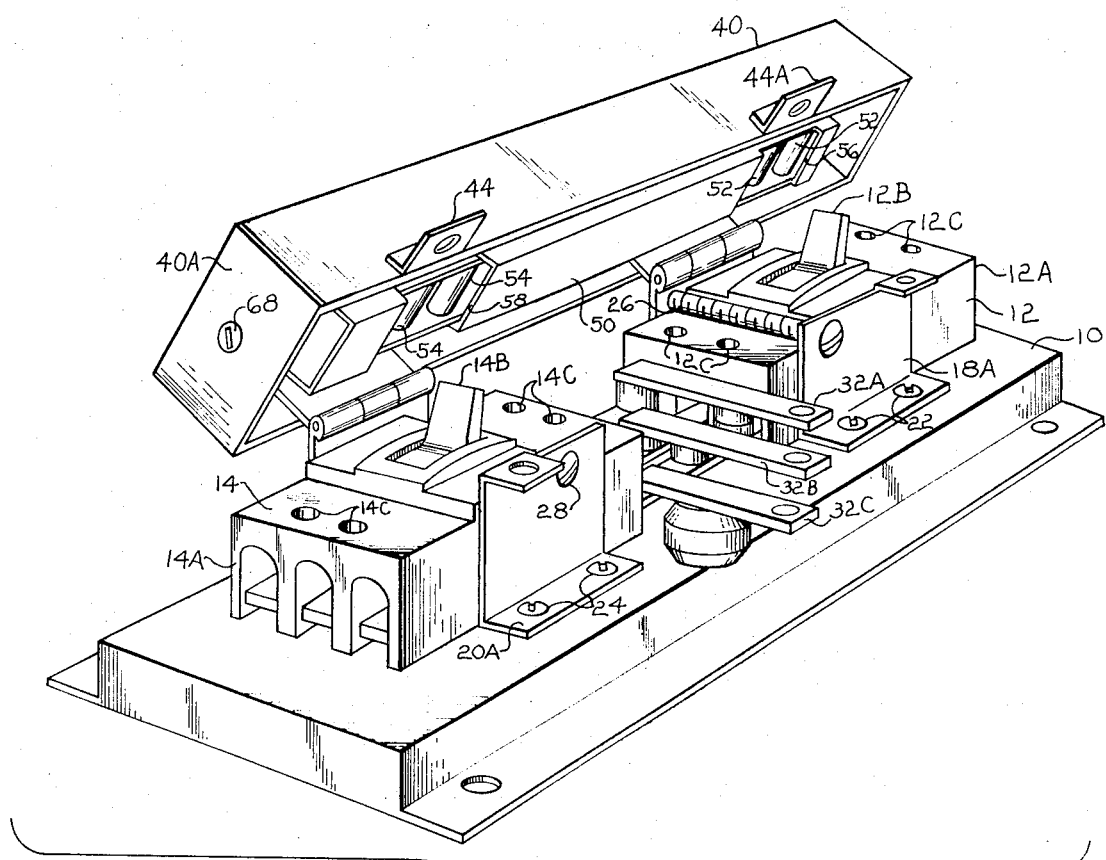
FIG. 1 is a perspective view of an electric power source transfer apparatus assembly in accordance with the invention, shown with the automatic operating mechanism in open or retracted position.
Figure 2:
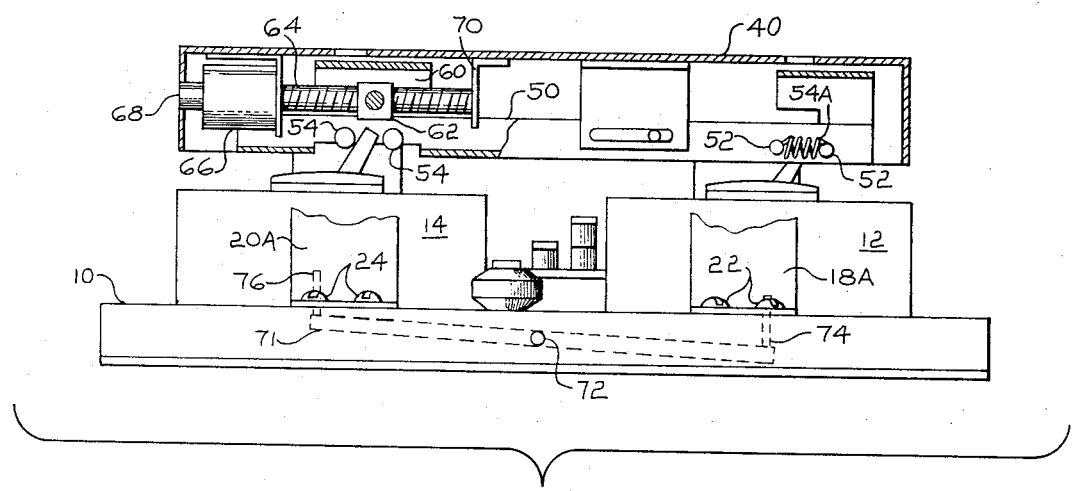
FIG. 2 is a side elevational view of the apparatus of FIG. 1, with the automatic operating mechanism in closed or normal operating position, certain portions being broken away.
Figure 3:
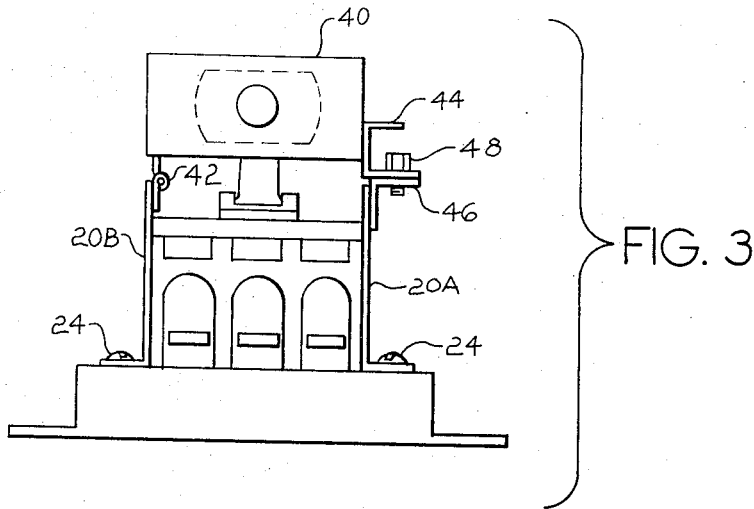
FIG. 3 is an end elevation of the apparatus of FIG. 1, the automatic operating mechanism being shown in closed or operating position

Referring to FIGS. 1-3, the invention is shown as embodied in an electrical apparatus assembly comprising a main supporting base 10 of inverted pan shape, of suitable rigid sheet material. Supported on the base 10 are a pair of multi-pole electric switching devices 12 and 14. In accordance with the invention, the switching devices 12 and 14 preferably comprise molded case circuit breakers, each having a generally rectangular insulating housing 12A and 14A enclosing all parts thereof except the operating handles 12B, 14B. The circuit breakers 12 and 14 are each retained on the supporting base 10 by means of bolts (not shown) which pass through openings 12C, 14C in the respective circuit breakers and thread into tapped holes (not shown) in the base 10.

The circuit breakers 12 and 14 are preferably of identical construction although, if desired, either one or both may be of the "non-automatic" type, that is, a circuit breaker having its usual current-responsive elements removed and the releasable member of its operating mechanism permanently held in "latched" position. Thus, for example, the circuit breaker 12 which is connected to the normal power supply, (FIG. 4), may include current responsive means so that the circuit breaker 12 performs a protective function guarding against excessive current being drawn by the power consuming apparatus. At the same time, the circuit breaker 14, which is connected to the emergency power source, may be of the non-automatic type since the emergency power source itself may contain protective devices guarding against the drawing of excessive current from it. In all other respects, however, the circuit breakers 12 and 14 are preferably identical. This applies particularly to the handle and operating mechanism characteristics, for reasons which will be pointed out below.

The circuit breakers 12 and 14 illustrated are each of the three-pole type, having three current paths therethrough, although all of the contacts therein are operated simultaneously by a single operating handle. The circuit breakers 12 and 14 have their respective "pole" terminals interconnected directly by busbars 30A, 30B, 30C (see FIGS. 1 and 4 particularly). A set of main power busbars 32A, 32B, 32C are connected to the busbars 30A, 30B, 30C, respectively, and have connecting terminals 34A, 34B, 34C respectively, for connection to power consuming apparatus.

Figure 4:
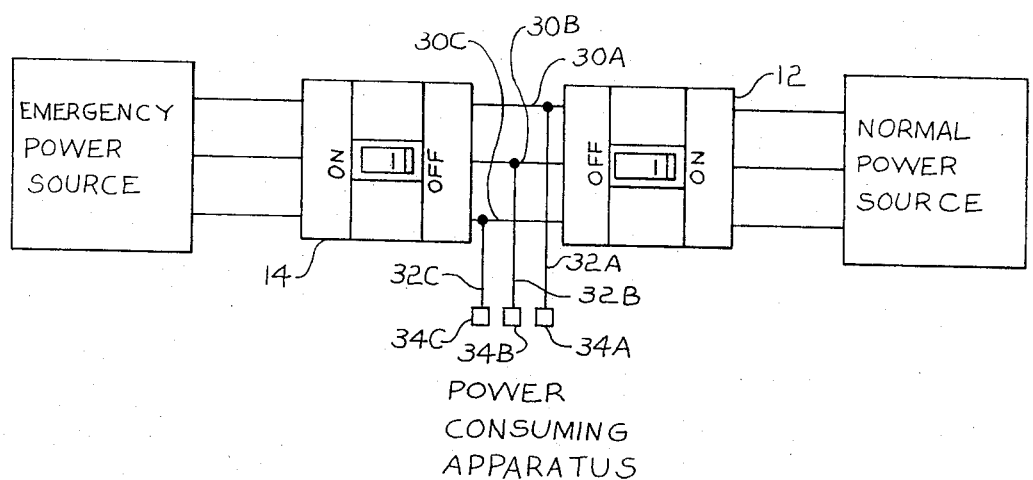
FIG. 4 is a diagram of the power circuit connections of the apparatus of FIG. 1 when in use.

It will be observed that the circuit breakers 12 and 14 are disposed on the support 10 with their output or "load" ends in adjacent spaced relation, as shown particularly in FIG. 4.

For the purpose of automatically operating one of the circuit breakers 12, 14, from closed to open position, and the other circuit breaker from open to closed position simultaneously, so as to switch the power-consuming apparatus from the normal power source to the emergency power source, automatic (motor-operated) equipment is provided. The automatic operating equipment referred to includes an elongated generally rectangular box-like enclosure 40, of suitable strong rigid sheet material.

A pair of supporting brackets 18A, 18B and 20A, 20B, respectively, are rigidly attached to the upper surface of the main support member 10 by suitable means such as by bolts 22 and 24 alongside the circuit breakers 12 and 14 respectively. The brackets 18A, 18B and 20A, 20B extend above the top surface of the circuit breakers 12 and 14, as best shown in FIG. 3. The brackets 18A, 18B are interconnected by a bolt 26 which closely overlies the top surface of the circuit breaker 12. Likewise, the brackets 24 are interconnected by a bolt 28 similarly positioned with respect to the circuit breaker 14. The enclosure 40 is supported on the brackets 18B and 20B by means of hinges, only one, 42, being shown clearly (see FIG. 3). The hinges 42 are disposed in spaced relation along one longitudinal side of the enclosure 40, permitting the enclosure 40 to swing between a closed position as shown in FIG. 3 and an open position as shown in FIG. 1, to afford access to the operating handles of the circuit breakers 12 and 14. Since the enclosure 40 is hinged at one of its longitudinal sides, the radius of the arc of movement through which it moves in going from closed to retracted or open position, is very short, and a minimum of clearance space is required.

Along the longitudinal edge opposite the hinged edge, the enclosure 40 includes a pair of outwardly turned flange portions 44 and 44A, which, when the enclosure is in its normal closed position as shown in FIG. 3, rest on corresponding outwardly turned flanges 46 carried by the brackets 18A and 20A, being firmly held in the closed position by suitable means such as by bolts 48. It will be observed that the enclosure 40 is no wider than the width of the circuit breakers 12 and 14, plus the thickness of material of the brackets 18A, 18B, 20A, 20B, respectively.

For the purpose of operating the handles 12B and 14B of the circuit breakers 12 and 14 simultaneously, a handle operating slide 50 is provided, see particularly FIGS. 1 and 2. The handle operating slide 50 is an elongated relatively narrow rigid member which is of a generally shallow channel shape cross-section throughout the major portion of its length.

The handle operating slide 50 has two pairs of handle engaging rollers 52 and 54 respectively, which are loosely mounted in the slide 50, and interconnected by tension springs 54. The slide 50 is further provided with openings 56, 58, see FIG. 1, for receiving the operating handles of circuit breakers.

At its left end as viewed in FIG. 2, the slide 50 has a portion 60 which is connected to a traveling nut 62, of the recirculating ball-bearing type, supported on a spirally grooved shaft 64 extending from a drive motor 66.

The motor 66 has an end abutment portion 68 which, in the form shown, extends through an opening in the end wall of the enclosure 40 and which has a slot therein which permits manual rotation of the motor shaft with a tool such as a screwdriver should this become necessary. In larger sizes, the abutment 68 may be spaced from, but accessible through the opening. The opposite end of the shaft 64 is supported on a bracket 70 rigidly attached to the housing of enclosure 40 by suitable means (not shown). The handle operating slide 50 is slidably guided for longitudinal movement by suitable means (not shown) comprising, for example, a first rigid stationary bracket or frame member which supports the portion 60 which is driven by the traveling nut 62 and a second rigidly fastened guide member (not shown) adjacent the opposite end of the slide.

In a typical operation, assuming the parts to be in the condition illustrated in FIG. 2, in which the circuit breaker 12 is in ON position and the circuit breaker 14 is in OFF position, if there is a failure of the normal power source, this is indicated by suitable means, such as by an under-voltage sensing device (not shown). This device closes contacts (not shown) which initiate operation of the motor 66 which derives its power from the stand-by power source, and which drives the slide to the left as viewed in FIG. 2. This disconnects the power consuming apparatus from the normal power source and then connects it to the emergency or stand-by power source. The motor 66 is deenergized, when the slide 50 has completed its travel, by engagement of the slide 50 with a limit switch (not shown).

Figure 5:
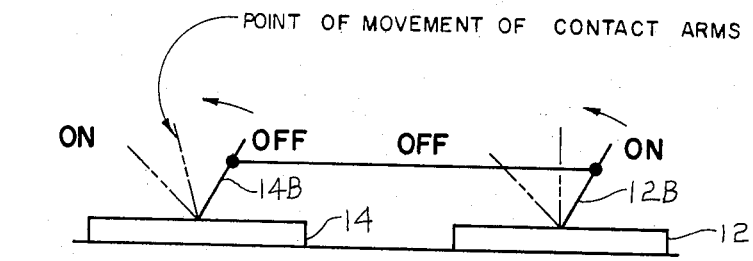
FIG. 5 is a diagrammatic representation of the handle operation characteristics of the switching devices of the apparatus of FIG. 1.

As previously mentioned, the circuit breaker mechanisms are of a particular prior art type which, as illustrated in FIG. 5, have the following important characteristics. In each of the circuit breakers 12 and 14, the operating handle must travel farther in the direction from OFF to ON before causing movement of the contact members than the same handle has to travel in the direction from ON to OFF before causing movement of the contact members. Accordingly, even though the handles are moved simultaneously, the circuit breaker which is initially in the ON position will go to the OFF position before the circuit breaker which is initially in the OFF position goes to the ON position. This is illustrated diagrammatically in FIG. 5. Thus advantage is taken of this characteristic of this type of circuit breaker mechanism to insure that the circuit breakers 12 and 14 will never both be in the ON position at the same time.

As an additional precaution, a "walking beam" interlock member 71, see FIG. 2, is provided, which is pivotally supported in the sides of the generally inverted channel-shaped basic support member 10 at 72. The walking beam interlock member 71 carries at its opposite ends upwardly extending projection members 74 and 76 which enter through holes provided in the back walls of the circuit breakers 12 and 14 respectively. The projections 74 and 76 are positioned such that they are engaged by the contact arms of the corresponding circuit breaker when it is in ON position. The walking beam interlock member 71, with its projections,, positively prevents both of the circuit breakers 12 and 14 from being in the ON position at the same time. Thus, for example, in the unlikely event that the contacts of the circuit breaker 12 should become welded in the closed circuit position, the operating mechanism operated by the motor 66 will move the handle operating member 50 in longitudinal direction, but the contact arms of the circuit breaker 14 will be positively prevented from moving to closed circuit position because of engagement with the projection 76 carried by the walking beam member 71.

The over-center handle operating sequence described also operates when the slide moves in the opposite direction, that is, from left to right as viewed in FIGS. 2 and 5. Accordingly, when returning to the normal power source, the emergency power source is disconnected first before the normal power source is reconnected.

If it is desired to utilize circuit breakers which have a symmetrical operating characteristic, such, for instance, as moving the contact arms to closed position when the handle is operated about half way of its full travel and also moving the contact arms to open circuit position when the handle is moved about one-half of its total movement, then in that case, it is within the contemplation of the invention to provide lost motion means by which the handle, which is in the ON position is engaged first by the slide member 50 and moved toward OFF position, and the handle of the circuit breaker which is in the OFF position is picked up and operated at a slightly later time by the slide member 50. Resilient over-travel means (not shown) is provided in this case, carried by the slide member 50 which permits the slide to move the required full distance to move the handle of the circuit breaker which is initially in the OFF position fully to the ON position, although the other circuit breaker may have already been operated to its full OFF position.

In order to clearly indicate the condition of the circuit breakers, when the motor operated mechanism is in its closed position overlying the tops of the circuit breakers, the slide 50 is provided with a pair of upstanding "flag" brackets 80, only one shown. The top surface of the enclosure 40 of the operating mechanism is likewise provided with openings affording visual access to a porition of the flag members bearing ON or OFF indication. Thus, in operation, the operator or user can tell simply by looking at the top of the enclosure 40 which circuit breaker is in closed position. The openings in the top wall of the enclosure 40 are not shown as such in the drawings, except at 40A and 40B in FIG. 2. Additionally, indicating lights (not shown) may be provided if desired.

Because the housing 40, together with its motor operator, drive screw, operating slide, etc., is pivoted along one longitudinal side, when the assembly is installed in vertical position, i.e., with one circuit breaker above the other, the automatic operating mechanism may be swung to a retracted position as shown in FIG. 1, without requiring large clearance space for movement, and also without operating in opposition to the force of gravity.

If the circuit breakers 12 and 14 are of the type which include automatic current responsive devices such as to cause tripping of the circuit breakers upon the occurrence of overload or short circuit current conditions therethrough, the circuit breaker mechanisms will trip despite the retension of the handle operating member 12B, 14B, in the ON position. The tripping of the circuit breaker mechanism may be indicated by a "bell alarm" or indicating light or both.

To reset the tripped circuit breaker, the motor operating mechanism is moved to its open or retracted position, and the tripped circuit breaker is reset manually by moving its operating handle to and a little beyond its normal OFF position in a conventional manner. When the tripped circuit breaker has been reset, it can be returned to the ON position, assuming that the cause of the overload or short circuit has been removed, by the automatic operating means which if desired may be controlled by a manually operated "push button."

It will be observed that an electric power source transfer apparatus has been provided which is extremely compact, which utilizes only a single driving motor, which occupies a minimum of space, such, for example, as not substantially more than the width of the circuit breakers and also not substantially more than the over-all length occupied by the spaced circuit breakers. In addition, an automatic electric power source transfer apparatus has been provided which is of high capacity although of compact construction because switching devices of the circuit breaker type are utilized. Furthermore, important advantages in the way of simplification of the mechanism are achieved by the configuration of the circuit breakers in which they are disposed in end-to-end alignment with the load or output ends of the circuit breakers in adjacent space relation, and with their operating handles operating along the same line of action but in reversed sense, whereby a single ganging member which is longitudinally slidable may be utilized, combined with an operating motor with a drive shaft and a traveling nut which offers extremely high mechanical advantage. In addition to these advantages, the automatic operating mechanism is contained within an enclosure which protects all parts of it from accidental contact or contamination in ordinary use, but which can readily be swung out of the way by movement through a very short arc of movement since the enclosure is elongated and narrow and is hingedly supported by hinges along one longitudinal side, permitting access to the circuit breakers for manual operation and for removal of such circuit breakers for repair or replacement, and also for access to the interconnecting busing such as for tightening the connections thereof after the apparatus has been in use for some time.

While only one particular embodiment, and minor modifications thereof have been disclosed, it will be readily obvious that many modifications may be made by those skilled in the art, and it is therefore intended by the appended claims to cover all such modifications as fall within the true spirit and scope of the invention.

We claim:

1. Automatic electric power source transfer apparatus comprising:

a. a support, b. a pair of multi-pole enclosed electric switching devices disposed on said support in end-to-end alignment with output ends of said switching devices in adjacent spaced relation, and with the operating handles of said devices moving in reciprocal fashion along a common line of action;

c. handle operating means comprising an elongated rigid handle operating slide member extending between the handles of said switching devices and including portions engaging said handles respectively for movement of said handles substantially simultaneously by reciprocal sliding movement of said handle operating slide member;

d. motor operated means for moving said operating slide from one extreme longitudinal position to an opposite extreme longitudinal position to operate both of said enclosed switching devices simultaneously;

e. whereby one of said switching devices is moved from ON to OFF position by longitudinal movement of said slide member while the other handle of the other switching device is moved from OFF to ON position;

f. electrical interconnecting means connecting the respective poles of said multi-pole switching devices at their adjacent ends, and power take-off terminals attached to said interconnecting conductors for supplying power consuming apparatus from a normal source when one of said switching devices is in closed position and for utilizing power from an emergency stand-by power source when the other of said switching devices is in closed circuit position;

g. means for supporting said rigid elongated handle operating slide member substantially independently of said switching devices, and supporting means comprising a box-like enclosure of rigid material including hinge means supporting said enclosure for pivotal movement about a first position in which said elongate handle operating slide member is in engagement with said handles of said devices and a second position in which said elongated handle operating slide member is out of engagement with handles of said devices so as to afford access to said operating handles for manual operation; and h. a walking beam interlock member pivotally mounted to said support and having projection members extending upwardly from opposite ends of said interlock member and engaging said devices so as to prevent both of said devices from being in the ON position at the same time.

2. Automatic electric power source transfer apparatus comprising:

a. a generally planar support;

b. a pair of multi-pole enclosed electrical switching devices supported on said support in end-to-end alignment with output ends adjacent each other;

c. each of said switching devices having a plurality of contact arms and an over-center spring type operating mechanism and an operating handle for operating said contact arms by means of said over-center spring mechanism;

d. electrical busing means interconnecting the respective poles of said multi-pole switching devices at said adjacent ends, and electric power take-off means connected to said interconnecting busing means for supplying power to power consuming apparatus;

e. an elongated rigid handle operating slide member extending between said enclosed switching devices and including portions engaging each of the handles of said switching devices respectively, whereby longitudinal movement of said operating slide causes simultaneous movement of one of said switching devices from ON to OFF position and the other of said switching devices from OFF to ON position;

f. motor operated means for operating said handle operating slide;

g. said apparatus also comprising means for assuring that a first one of said switching devices which is initially in ON position is operated by said slide to OFF condition before the other of said switching devices which is initially in OFF condition is operated to ON condition without a mechanical linkage interconnecting said contact arms of said first switching device to said contact arms of said other switching device; and h. means for supporting said rigid elongated handle operating slide member substantially independently of said switching devices, and supporting means comprising a box-like enclosure of rigid material including hinge means supporting said enclosure for pivotal movement about a first position in which said elongated handle operating slide member is in engagement with said handles of said devices and a second position in which said elongated handle operating slide member is out of engagement with said handles of said devices so as to afford access to said operating handles for manual operation.

3. Electric power source transfer apparatus comprising:

a. a generally planar support;

b. a pair of multi-pole electric switching devices supported on said support with output ends thereof in adjacent spaced relation, each of said multi-pole switching devices having a single externally available opeerating handle for operating all poles of said switching device simultaneously;

c. automatic operating mechanism for said operating handles of said circuit breakers;

d. means supporting said automatic operating mechanism on said support substantially independently of said switching devices, said automatic operating mechanism being positioned immediately above said switching devices and including an elongated rigid handle operating slide member extending between the handles of said switching devices and including portions engaging said handles respectively for movement of said handles substantially simultaneously by reciprocal sliding movement of said handle operating slide member;

e. said supporting means comprising a generally rectangular box-like enclosure of rigid material including hinge means supporting said generally rectangular enclosure for pivotal movement about one of the longitudinal sides thereof between a first position in which said elongated rigid handle operating slide member is in engagement with said handles and a second position in which said elongated rigid handle operating slide member is out of engagement with said handles, affording access to said operating handles for manual operation;

f. interconnecting busing means interconnecting the output ends of said multi-pole switching devices together in pole-to-pole relation, said hinge means supporting said automatic operating mechanism on said main support member permitting movement of said operating mechanism to a retracted position in which access is permitted to said interconnecting busing means as well as to said operating handles;

g. electric motor drive means supported within said generally rectangular enclosure of said automatic operating mechanism and including an elongated spiral grooved drive shaft and a traveling nut member supported on said shaft;

h. means connecting said traveling nut to said means engaging said handles of said switching devices; and i. said electric motor drive means acting on said means engaging said handles of said switching devices when energized to move said operating handles substantially simultaneously and to move a first one of said switching devices from an initially closed condition to open condition prior to movement of the second of said switching devices from an initially open condition to closed condition despite said simultaneous movement of said handles.

4. Electric power source transfer apparatus as set forth in claim 3 said apparatus also comprising:

a. means connecting said input end of said first switching device to a normal external source of power and means connecting said input end of said second switching device to an emergency stand-by source of electric power;

b. electric circuitry means including means sensing loss of power from said normal external source of power and initiating operation of said motor drive means to open said first switching device and to subsequently close said second switching device, whereby to disconnect said power consuming apparatus from said normal power source and to connect said power consuming apparatus to said emergency power source; and c. said electric circuitry also including means sensing the restoration of power by said normal power source and to thereby initiate operation of said motor drive to move said second switching device from said closed circuit position to open circuit position and to subsequently operate said first switching device from said open circuit position to said closed circuit position whereby to disconnect said power consuming apparatus from said emergency stand-by source of electric power and to reconnect said power consuming apparatus to said normal external power source.

5. Electric power source transfer appparatus as set forth in claim 3 in which said electric switching devices may be removed for repair or replacement without removing said automatic operating mechanism from its mounting on said main support member.

6. Electric power source transfer equipment as set forth in claim 5 in which said switching devices are disposed in end-to-end spaced alignment with said output ends of said switching devices adjacent each other and with said operating handles of such switching devices moving along a substantially common line.

7. Electric power source transfer equipment as set forth in claim 6 in which said apparatus also includes interlock means positively preventing the closure of both of said switching devices at the same time.

8. Electric power source transfer equipment as set forth in claim 3 in which said means supporting said automatic operating mechanism on said main support comprises at least one pair of rigid bracket members rigidly attached at one end to said main support and extending closely adjacent said switching devices, and a member extending between each of said pairs of brackets and overlying a corresponding one of said switching devices.

9. Electric power source transfer equipment as set forth in claim 3 in which each of said multi-pole switching devices includes an over-center type operating mechanism having the characteristic that said operating handle thereof is required to move a greater portion of the distance between ON and OFF positions when moving in ON direction before causing operation of said switching device than when moving in OFF direction, whereby simultaneously movement of said handles results in opening of the one of said switching devices which is initially in closed condition prior to closing of the one of said switching device which is initially in said open condition.

10. Electric power source transfer equipment as set forth in claim 8 in which at least one of said switching devices comprises an automatic molded case electric circuit breaker including means for causing automatic tripping of said circuit breaker upon the occurrence of predetermined excessive current conditions therethrough.

* * * * *

PO-1050
(5/69)

UNITED STATES PATENT OFFICE
CERTIFICATE OF CORRECTION

Patent No. 3,778,633      Dated December 11, 1973

Inventor(s) Christian DeVisser & Donald O. Myers

It is certified that error appears in the above-identified patent and that said Letters Patent are hereby corrected as shown below:

| | |
|---|---|
| Column 9, line 36, | "and" should be - said - |
| line 40, | "elongate" should be - elongated - |
| line 44, | after "with" insert - said - |
| Column 10, line 17, | "condition" should be - position - |
| line 18, | "condition" should be - position - |
| line 19, | "condition" should be - position - |
| line 25, | "and" should be - said - |
| line 44, | "opeerating" should be - operating - |
| Column 12, line 38, | "simultaneously" should be - simultaneous - |

Signed and sealed this 7th day of May 1974.

(SEAL)
Attest:

EDWARD M.FLETCHER,JR.
Attesting Officer

C. MARSHALL DANN
Commissioner of Patents